(12) United States Patent
Jiang et al.

(10) Patent No.: US 12,061,885 B2
(45) Date of Patent: Aug. 13, 2024

(54) CROSS-LANGUAGE COMPILATION METHOD AND DEVICE

(71) Applicant: HUAWEI TECHNOLOGIES CO., LTD., Shenzhen (CN)

(72) Inventors: Yi Jiang, Shenzhen (CN); Yongjian Chen, Beijing (CN); Chao Zhang, Shenzhen (CN); Junmin Zhao, Shenzhen (CN); Yan Zhang, Santa Clara, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 17/484,504

(22) Filed: Sep. 24, 2021

(65) Prior Publication Data

US 2022/0012029 A1   Jan. 13, 2022

Related U.S. Application Data

(63) Continuation of application No. PCT/CN2020/081000, filed on Mar. 25, 2020.

(30) Foreign Application Priority Data

Mar. 25, 2019 (CN) .......................... 201910228528.7

(51) Int. Cl.
*G06F 8/51* (2018.01)
*G06F 8/30* (2018.01)
(Continued)

(52) U.S. Cl.
CPC ................ *G06F 8/51* (2013.01); *G06F 8/315* (2013.01); *G06F 8/434* (2013.01); *G06F 9/4552* (2013.01)

(58) Field of Classification Search
CPC . G06F 8/51; G06F 8/315; G06F 8/434; G06F 9/4552
(Continued)

(56) References Cited

U.S. PATENT DOCUMENTS

2006/0190935 A1   8/2006   Kielstra et al.
2006/0259488 A1*  11/2006  Bernabeu-Auban .... G06F 9/468
                                                   707/999.009
(Continued)

FOREIGN PATENT DOCUMENTS

| CN | 103077011 A | 5/2013 |
|---|---|---|
| CN | 106775616 A | 5/2017 |
| CN | 107341010 A | 11/2017 |

OTHER PUBLICATIONS

European Search Report issued in corresponding European Application No. 20776538.9, dated Mar. 31, 2022, pp. 1-9.
(Continued)

*Primary Examiner* — Bradford F Wheaton
(74) *Attorney, Agent, or Firm* — HAUPTMAN HAM, LLP

(57) ABSTRACT

A compilation method includes obtaining a source program code. The source program code includes a first function in a first language code and a second function in a second language code. The first language code is a native language. The second language code is a non-native language. The method also includes generating a third language code based on the source program code. The third language code includes a third function, a fourth function and a fifth function. The third function is generated based on the first function. The fourth function is generated based on the second function. The fifth function is generated based on the first function and the second function. Executing the third function invokes the fourth function via the fifth function.

18 Claims, 10 Drawing Sheets

(51) Int. Cl.
*G06F 8/41* (2018.01)
*G06F 9/455* (2018.01)

(58) Field of Classification Search
USPC .......................................................... 717/137
See application file for complete search history.

(56) References Cited

U.S. PATENT DOCUMENTS

| | | |
|---|---|---|
| 2009/0172652 A1 | 7/2009 | Simon et al. |
| 2012/0167067 A1* | 6/2012 | Low .................... G06F 9/4484 717/148 |
| 2015/0095626 A1* | 4/2015 | Nakagawa .............. G06F 11/30 712/227 |
| 2017/0046137 A1* | 2/2017 | Grimmer .................. G06F 8/41 |

OTHER PUBLICATIONS

International Search Report issued in corresponding International Application No. PCT/CN2020/081000, dated Jun. 23, 2020, pp. 1-10.

* cited by examiner

```
(1) jclass cls = env->FindClass("jni/test/Demo");
(2) jmethodID mid= env->GetMethodID(cls,"getMessage","()Ljava/lang/String;");
(3) jmethodID con=env->GetMethodID(cls,"<init>","(Ljava/lang/String;)V");
(4) jobject obj = env->NewObjectA(cls,con,arg);
(5) jstring msg = (jstring)env-> CallObjectMethod(obj, mid);
(6) jfieldID fid = (*env)->GetFieldID(env, cls, "key", "Ljava/lang/String;");     A
```

```
    struct {
void *shadow;
int32_t monitor;
    char *classname;
    void *itab;
    void *vtab;
    FieldMetadata *fields;
    MethodMetadata *methods;
    union {          B
```

```
    struct {
void *shadow;
    int32_t monitor;
int32_t methodname;      C
    int32_t signaturename;
    void *addr;
```

```
    struct {
    void *shadow;
    int32_t monitor;
int32_t fieldname;
    union {
        const char *name;      D
        void *klass;
    } type;
    void *declaringclass;
    union {
        uint64_t realOffset;
```

FIG. 8

CROSS-LANGUAGE COMPILATION METHOD AND DEVICE

CROSS-REFERENCE TO RELATED APPLICATIONS

This application is a continuation of International Application No. PCT/CN2020/081000, filed on Mar. 25, 2020, which claims priority to Chinese Patent Application No. 201910228528.7, filed on Mar. 25, 2019. The disclosures of the aforementioned applications are hereby incorporated by reference in their entireties.

TECHNICAL FIELD

This application relates to a computer code compilation technology, and in particular, to a cross-language mixed compilation technology.

BACKGROUND

To balance development efficiency and program performance, mixed language programming of a native language and a non-native language becomes a trend. For example, non-native languages such as Java, JavaScript, and Python all support mixed language programming with C/C++. When source code for the mixed language programming is compiled, native language code and non-native language code are invisible to each other in a compilation process. In this case, cross-function compilation optimization can be performed only within a same language function scope. In a Java Virtual Machine (JVM), a Java program is compiled into bytecode that is not related to the JVM and an operating system. A C/C++ program is compiled into a binary executable program that is related to the target machine. In a compilation process, the Java program and the C/C++ program are invisible to each other. In an execution phase, the Java bytecode is first interpreted by an interpreter for execution. When a quantity of execution times of same code reaches a threshold, the code is compiled into binary code related to the JVM, and then the binary code obtained after compilation is executed.

In the mixed language programming, to implement function invocation between the native language and the non-native language, a Java function invokes a C/C++ function through a JNI, and the C/C++ function invokes Java code and accesses a Java object or a Java class object through a reflection mechanism. Different VMs need to be compatible and the Java code and C/C++ code are invisible to each other. Consequently, both the Java native interface (Java Native Interface, JNI) and the reflection mechanism need to be implemented in a most conservative manner, resulting in high overheads in the JNI and the reflection mechanism.

SUMMARY

This application provides a compilation method and apparatus, to reduce overheads of mutual invocation between a native language function (also called "Method" or "method") and a non-native language function (also called "Method" or "method") when an executable program obtained after compilation runs.

According to a first aspect, this application provides a compilation method. The method includes: obtaining source program code, where the source program code includes first language code and second language code, the first language code includes a first function (also called "Method" or "method"), the second language code includes a second function (also called "Method" or "method"), the first language code is a native language, and the second language code is a non-native language; and generating third language code based on the source program code, where the third language code includes a third function (also called "Method" or "method") and a fourth function (also called "Method" or "method"), the third function is generated based on the first function, the fourth function is generated based on the second function, the third language code further includes a fifth function (also called "Method" or "method"), the fifth function is generated based on the first function and the second function or generated based on the third function and the fourth function, and the fifth function is used by the third function to invoke the fourth function or used by the fourth function to invoke the third function.

The third language code may be an intermediate language. In other words, the source program code that includes the native language and the non-native language is converted into a same intermediate language. The intermediate language includes a function that can be used to implement mutual invocation between a function corresponding to the native language and a function corresponding to the non-native language. Because a compiler can learn of function information of the native language and function information of the non-native language at the same time by using the intermediate language, when the invocation function between the native language and the non-native language is generated, the invocation function may be optimized based on the function information of the native language and the function information of the non-native language. This reduces overheads of the mutual invocation between the native language function and the non-native language function at runtime.

In some implementations, an intermediate language function carries a function attribute flag, and the flag is used to indicate whether the intermediate language function is converted from the native language or converted from the non-native language. This flag can be used to perform stack unwinding quickly when an exception occurs during running.

In some implementations, the invocation function in the intermediate language is used to complete, at runtime, the invocation between the function converted from the non-native language and the function converted from the native language with reference to the function converted from the non-native language and the function converted from the native language.

In some other implementations, when the invocation function in the intermediate language is generated, the function converted from the non-native language and the function converted from the native language may be integrated into the invocation function in an inline manner, so that at runtime, the invocation function can independently implement the mutual invocation between the function converted from the non-native language and the function converted from the native language.

When the fifth function in the third language code is generated, the fifth function in the third language code may be optimized based on the first language code, the second language code, or the generated third language code.

In an implementation, when the fifth function is generated, it is determined whether an exception occurs in the first function or the third function. If the exception occurs in the first function or the third function, the fifth function used by the fourth function to invoke the third function is generated, where the fifth function includes an exception handling function. In a conventional technology, when a native language function is invoked, exception handling needs to be invoked at runtime, to check whether there is an unprocessed exception object. In this implementation method, the invocation method is generated in a compilation process, and the exception handling function is included only when the exception occurs in the native language. This reduces exception handling overheads at runtime.

In an implementation, it is determined whether the first function accesses an object in the second language code. If the first function accesses the object in the second language code, an object reference table in the second language code is generated in the second language code when the third language code is generated based on the source program code. In this implementation, when an intermediate language code is generated, an object reference status function in the second language code by the first function may be analyzed, the object reference table is created as required, and a reference that is no longer used is released in a timely manner. In this way, overheads of creating the object reference table can be reduced.

In an implementation, it is determined whether the first function accesses a JNI interface pointer in the second language code. If the first function accesses the JNI interface pointer in the second language code, the JNI interface pointer is added to a parameter of the fifth function. In another implementation, it is determined whether the first function accesses a Java object or a Java class object in the second language code. If the first function accesses the Java object or the Java class object in the second language code, the Java object or the Java class object in the second language code is added to a parameter of the fifth function. In this way, invocation overheads caused by the JNI interface pointer, the Java object, or the Java class object can be reduced.

In an implementation, the third language code further includes field information of a class, function information of a class, and an inheritance relationship of a class that are in the second language code.

In a possible implementation, a signature of the second function in the second language code is determined based on the inheritance relationship of the class and the function information of the class, where the signature is used to indicate a name of the second function in the second language code and a class in which the second function is located in the second language code; and the fifth function is generated based on the signature.

In other possible implementations, a sixth function is generated in the third language code based on the inheritance relationship of the class and the field information of the class, where the sixth function is used to access a field in the second language code.

In some other possible implementations, data required for non-native language reflection is generated in the third language code. The data includes metadata information of a class, field information of a class, and function information of a class.

In some other possible implementations, an interface function table of a class may be further generated when the third language code is generated. The interface function table includes a hash table and a conflict elimination table. When a program executes an interface function of the class at runtime, and searches the hash table for the interface function by using a hash value of a function signature. If the function is found, an address of the function is returned. Otherwise, the function signature is used to search the conflict elimination table for the function and the address of the function is returned. Because calculation of the interface function table and the hash value of the function signature is completed at a compilation time point, a variable-length hash table may be used and a plurality of types of hash functions may be used to reduce conflicts and reduce a size of the hash table, so as to reduce memory consumption and improve virtual vocation performance.

In some implementations, the third function and the fourth function include flags, and the flags are used to indicate that the third function is generated based on the native language or indicate that the fourth function is generated based on the non-native language.

According to a second aspect, an embodiment of this application further provides a compilation apparatus. The apparatus includes one or more functional units configured to implement the foregoing method steps. When the apparatus includes a plurality of functional units, the functional units usually one-to-one correspond to the foregoing method steps. For example, the apparatus includes an obtaining module, configured to obtain program source code, where the program source code includes native language code and non-native language code; generation module, configured to generate intermediate language code, and convert a native language function and a non-native language function that are in the source code into intermediate language functions; and generate an invocation function used to implement mutual invocation between the function converted from a non-native language and the function converted from a native language in the intermediate language code; an optimization module, configured to optimize the generated intermediate language code; and a compilation module, configured to generate a binary executable program based on the analyzed and optimized intermediate language code, to complete a compilation process. It should be noted that the functional unit may be implemented by using only a software program, or by using only hardware, or by using a combination of software and hardware.

According to a third aspect, an embodiment of this application further provides a computer system. The computer system includes at least one processor and a memory. The memory is configured to store a software program. When the software program is executed by the processor, the processor in the computer system is configured to perform the method according to any one of the first aspect or the implementations of the first aspect.

According to a fourth aspect, an embodiment of this application further provides a storage medium, configured to store a computer program. When the computer program is executed by a processor, the processor is configured to implement any method provided in the first aspect. Specifically, the computer program may include one or more program units configured to implement the steps in the method.

According to the embodiments of this application, when the mixed source code including the native language and the non-native language is compiled, the native language and the non-native language are converted into the intermediate language, and the invocation function is generated based on an invocation relationship between the native language function and the non-native language function, to implement the mutual invocation between the functions in the intermediate language. Because the compiler can learn of the function information of the native language and the function information of the non-native language at the same time by using the intermediate language, when the invocation function between the native language and the non-native language is generated, the invocation function may be optimized based on the function information of the native language and the function information of the non-native language. Compared with the conventional technology, the embodiments of this application reduces the overheads of the mutual invocation between the native language function and the non-native language function at runtime.

BRIEF DESCRIPTION OF DRAWINGS

To describe the technical solutions in the embodiments of this application or in the background more clearly, the following briefly describes the accompanying drawings for describing the embodiments of this application or the background.

FIG. 8 is a code example diagram according to an embodiment of this application;

DESCRIPTION OF EMBODIMENTS

Figure 1:
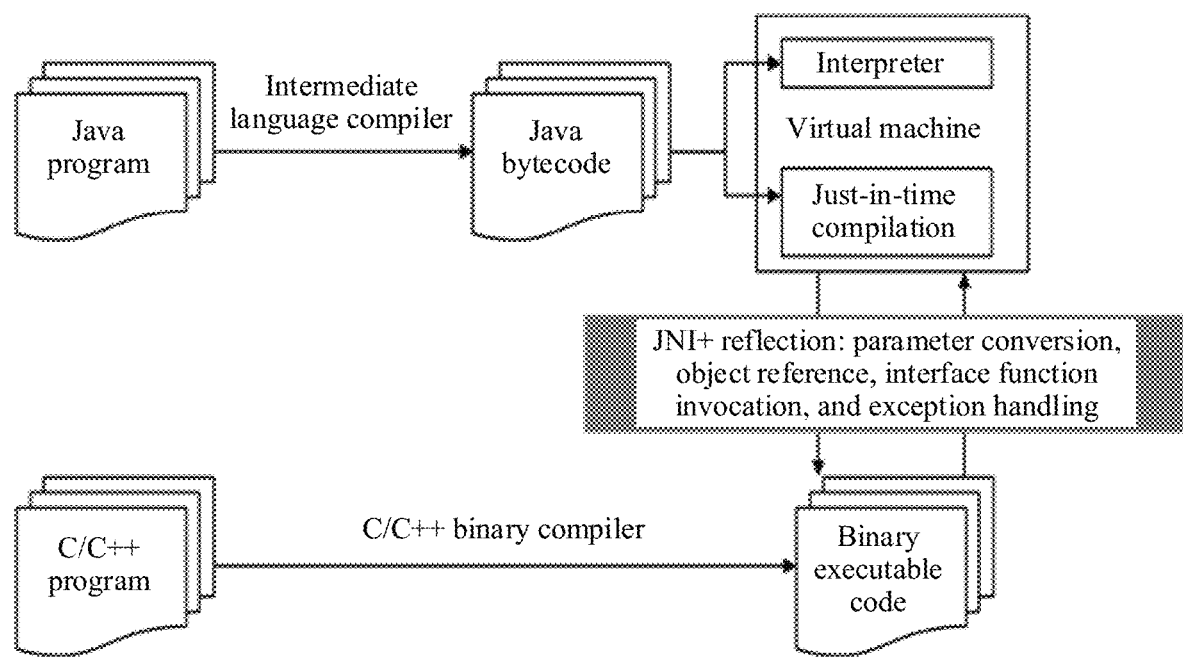
FIG. 1 is a schematic diagram of a compilation process of source code of mixed language programming by using mixed compilation of Java and C/C++ as an example.

For ease of understanding of embodiments of this application, some technical terms appearing in the embodiments of this application are first explained.

Native language (Native Language): The native language is also referred to as a host language. It is a communication language or code that is specially developed for a type of special devices, be used only on a specified target device, and cannot be transplanted to other devices. Even if the native language can be transplanted, working efficiency is low. For example, a C/C++ language is a typical native language.

Non-native language: The non-native language is also referred to as a non-host language. It is a programming language that implements platform independence, namely, a programming language that can be used on various devices or platforms. The non-native language can achieve platform universality through a runtime environment. For example, JAVA is a typical non-native language.

Java virtual machine (JVM): The Java virtual machine is a virtual computer component that exists only in a memory. The JVM allows a Java program to be executed on different platforms rather than only on one platform that compiles code for the Java program. The Java program is compiled for the JVM. In this way, the Java can support applications for a plurality of types of data processing systems. These data processing systems can include various central processing units and operating system architectures. To make Java applications to be executed on the different types of data processing systems, a compiler usually generates an architecture-neutral file format. If there is a Java runtime system, compiled code can be executed on a plurality of processors. The Java compiler generates bytecode instructions that are not specific to a specific computer architecture. Bytecode is machine-independent code generated by the Java compiler and interpreted by a Java interpreter. The Java interpreter is a module that is in the JVM and that alternately decodes and executes one or more bytecode. These bytecode instructions are designed to be easy to interpret on any machine and to be converted on the fly into host machine code.

Although the Java language is designed to be platform-independent and mainly executed in a secure environment, a programmer can extend the Java applications by using a C-style invocation convention through a Java native interface (JNI) to use a host language compiled on a host operating system. In this way, the Java applications can have full access to the host operating system, including reading or writing an additional I/O device, a memory, and so on. On this basis, the Java program can be platform-specific to accomplish a task that is not usually allowed by the JVM.

When the host language is invoked through the JNI in compiled Java code, overheads are involved. For example, preparation needs to be made at runtime, to perform invocation. In general, a host library including a host function needs to be loaded when or before the host function is invoked. The host function also needs to be resolved in the runtime system, and a related JVM data structure needs to be updated, to indicate use of the host function.

The embodiments of this application are used in compilation of source code of mixed language programming. The source code of the mixed language programming includes native language code and non-native language code. A native language function and a non-native language function invoke their respective functions, for example, the native language invokes the native language function or the non-native language function invokes the non-native language function. It is also possible to implement mutual invocation between the native language function and the non-native language function. In an existing compilation method, because the native language and the non-native language are compiled independently of each other, when the native language is compiled, the non-native language is invisible to the native language; or when the non-native language is compiled, the native language is invisible to non-native language.

FIG. 1 describes a compilation process of source code of mixed language programming by using mixed compilation of Java and C/C++ as an example. In a Java virtual machine (JVM), a Java program is compiled into Java bytecode that is not related to the JVM and an operating system. A C/C++ program is compiled into a binary executable program that is related to the target machine. In a compilation process, the Java program and the C/C++ program are invisible to each other. In an execution phase, the Java bytecode is first interpreted by an interpreter for execution. When a quantity of execution times of same code reaches a threshold, the code is compiled into binary code related to the JVM, and then the binary code obtained after compilation is executed. A Java function invokes a C/C++ function through a JNI, and the C/C++ function invokes Java code and accesses a Java object or a Java class object through a reflection mechanism.

Figure 2:
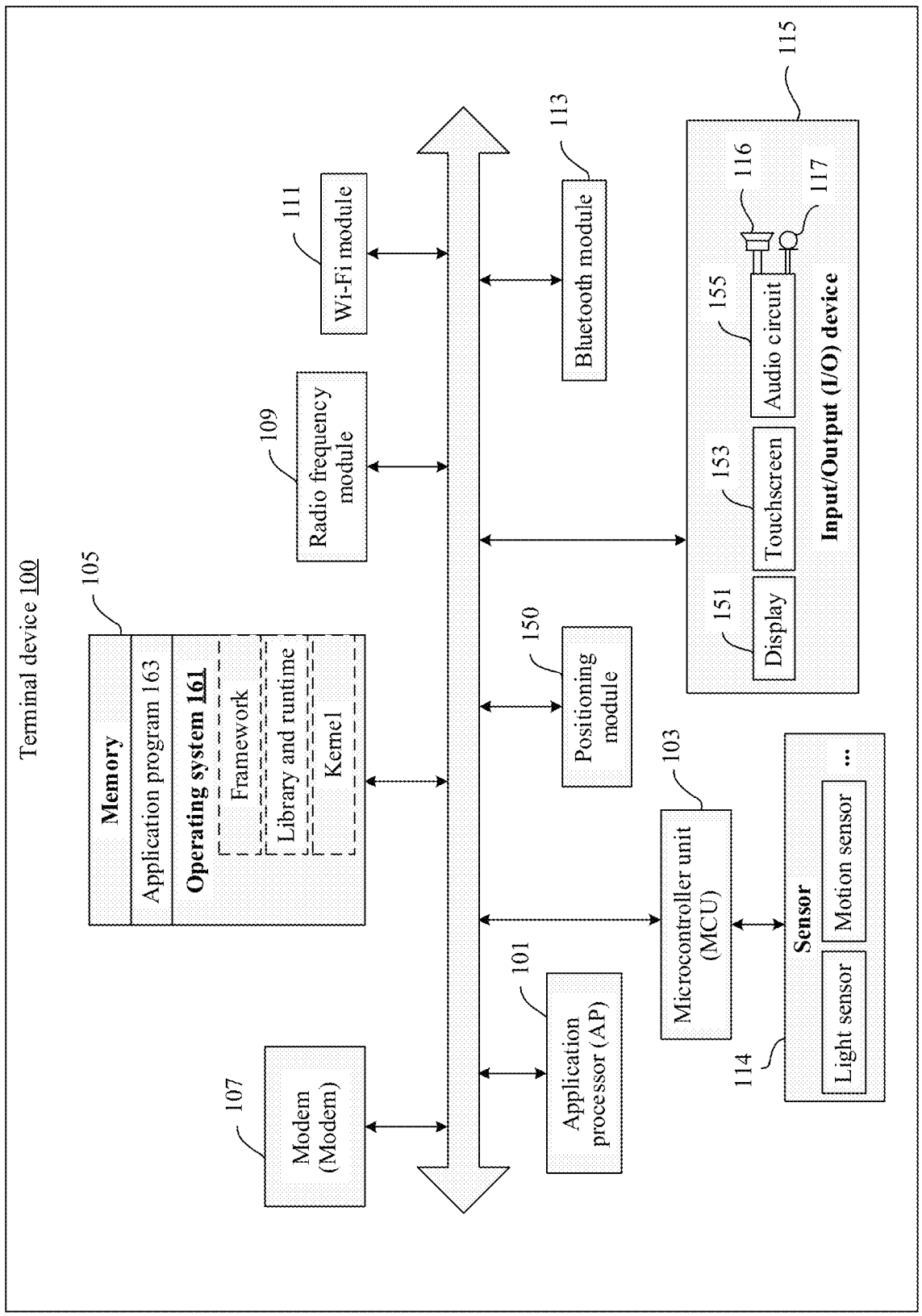
FIG. 2 is a schematic structural diagram of a terminal device according to an embodiment of this application.

FIG. 2 is an example of a schematic structural diagram of a terminal device 100. According to FIG. 2, the terminal device 100 includes an application processor 101, a microcontroller unit (MCU) 103, a memory 105, a modem 107, a radio frequency (RF) module 109, a Wireless-Fidelity (Wi-Fi for short) module 111, a Bluetooth module 113, a sensor 114, a positioning module 150, an input/output (I/O) device 115, and other components. These components can communicate with each other through one or more communication buses or signal lines. A person skilled in the art may understand that a hardware structure shown in FIG. 2 does not constitute a limitation on the terminal device, and the terminal device 100 may include more or fewer components than those shown in the figure, may combine some components, or may have different component arrangements.

The following describes each component of the terminal device 100 in detail with reference to FIG. 2.

The application processor 101 is a control center of the terminal device 100, and is connected to the components of the terminal device 100 through various interfaces and various buses. In some embodiments, the application processor 101 may include one or more processing units.

The memory 105 stores computer programs, such as an operating system 161 and an application program 163 shown in FIG. 2. The application processor 101 is configured to execute the computer programs in the memory 105, to implement functions defined by the computer programs. For example, the application processor 101 executes the operating system 161, to implement various functions of the operating system on the terminal device 100. The memory 105 further stores data other than the computer programs, for example, data generated by the operating system 161 and the application program 163 in a running process. The memory 105 is a non-volatile storage medium, and usually includes an internal storage device and an external storage device. The internal storage device includes but is not limited to a random access memory (Random Access Memory, RAM), a read-only memory (Read-Only Memory, ROM), a cache (cache), or the like. The external storage device includes but is not limited to a flash memory (flash memory), a hard disk, an optical disc, a universal serial bus (universal serial bus, USB) flash drive, or the like. The computer programs are usually stored in the external storage device. Before executing the computer programs, the processor loads the programs from the external storage device to the internal storage device.

The memory 105 may be independent, and is connected to the application processor 101 through a bus. Alternatively, the memory 105 and the application processor 101 may be integrated into one chip subsystem.

The MCU 103 is a coprocessor configured to obtain and process data from the sensor 114. A processing capability and power consumption of the MCU 103 are less than those of the application processor 101, but the MCU 103 has a feature of "always on (always on)", and can continuously collect and process the data from the sensor when the application processor 101 is in a sleep mode, to ensure normal running of the sensor with relatively low power consumption. In an embodiment, the MCU 103 may be a sensor hub chip. The sensor 114 may include a light sensor and a motion sensor. Specifically, the light sensor may include an ambient light sensor and a proximity sensor. The ambient light sensor may adjust luminance of a display 151 based on brightness of ambient light. When the terminal device 100 approaches an ear, the proximity sensor may power off a display screen. As a type of the motion sensor, an accelerometer sensor may detect values of acceleration in various directions (generally three axes), and may detect values and directions of gravity when the accelerometer sensor is still. The sensor 114 may further include other sensors such as a gyroscope, a barometer, a hygrometer, a thermometer, or an infrared sensor. Details are not described herein. The MCU 103 and the sensor 114 may be integrated into one same chip, or may be separate components and are connected through the bus.

The modem 107 and the radio frequency module 109 constitute a communication subsystem of the terminal device 100, and are configured to implement main functions of a wireless communication standard protocol such as 3GPP or ETSI. The modem 107 is configured to perform coding/decoding, signal modulation/demodulation, equalization, and the like. The radio frequency module 109 is configured to receive and send a radio signal, and the radio frequency module 109 includes but is not limited to an antenna, at least one amplifier, a coupler, a duplexer, and the like. The radio frequency module 109 cooperates with the modem 107 to implement a wireless communication function. The modem 107 may be used as an independent chip, or may be combined with another chip or circuit to form a system-level chip or an integrated circuit. These chips or integrated circuits may be used in all terminal devices that implement the wireless communication function, including a mobile phone, a computer, a notebook computer, a tablet computer, a router, a wearable device, a vehicle, a household appliance, and the like.

The terminal device 100 may further perform wireless communication through the Wi-Fi module 111, the Bluetooth module 113, and the like. The Wi-Fi module 111 is configured to provide, for the terminal device 100, network access that complies with a Wi-Fi related standard protocol. The terminal device 100 may access a Wi-Fi access point through the Wi-Fi module 111, to further access the internet. In some other embodiments, the Wi-Fi module 111 may alternatively be used as a Wi-Fi wireless access point, and may provide Wi-Fi network access for another terminal device. The Bluetooth module 113 is configured to implement short-range communication between the terminal device 100 and another terminal device (for example, a mobile phone or a smartwatch). The Wi-Fi module 111 in this embodiment of this application may be an integrated circuit, a Wi-Fi chip, or the like, and the Bluetooth module 113 may be an integrated circuit, a Bluetooth chip, or the like.

The positioning module 150 is configured to determine a geographical location of the terminal device 100. It can be understood that the positioning module 150 may be specifically a receiver of a positioning system, for example, a global positioning system (global positioning system, GPS), a BeiDou navigation satellite system, or a GLONASS in Russia.

The Wi-Fi module 111, the Bluetooth module 113, and the positioning module 150 may be independent chips or integrated circuits, or may be integrated together. For example, in an embodiment, the Wi-Fi module 111, the Bluetooth module 113, and the positioning module 150 may be integrated into a same chip. In another embodiment, the Wi-Fi module 111, the Bluetooth module 113, the positioning module 150, and the MCU 103 may also be integrated into a same chip.

The input/output device 115 includes but is not limited to the display 151, a touchscreen 153, an audio circuit 155, and the like.

The touchscreen 153 may collect a touch event of a user of the terminal device 100 on or near the touchscreen 153 (for example, an operation performed by the user on the touchscreen 153 or near the touchscreen 153 by using any suitable object such as a finger or a stylus), and send the collected touch event to another component (for example, the application processor 101). The operation performed by the user near the touchscreen 153 may be referred to as a floating touch. Through the floating touch, the user may select, move, or drag a target (for example, an icon) without directly touching the touchscreen 153. In addition, the touchscreen 153 may be a resistive touchscreen, a capacitive touchscreen, an infrared touchscreen, a surface wave sound touchscreen, or the like.

The display (also referred to as a display screen) 151 is configured to display information input by the user or information displayed to the user. The display may be configured in a form such as a liquid crystal display screen or an organic light emitting diode. The touchscreen 153 may cover the display 151. After detecting a touch event, the touchscreen 153 transmits the touch event to the application processor 101 to determine a type of the touch event, and then the application processor 101 may provide corresponding visual output on the display 151 based on the type of the touch event. In FIG. 2, the touchscreen 153 and the display 151 are used as two independent components to implement input and output functions of the terminal device 100. However, in some embodiments, the touchscreen 153 and the display 151 may be integrated to implement the input and output functions of the terminal device 100. In addition, the touchscreen 153 and the display 151 may be disposed on a front side of the terminal device 100 in a full panel form, to implement a bezel-less structure.

The audio circuit 155, a loudspeaker 116, and a microphone 117 may provide an audio interface between the user and the terminal device 100. The audio circuit 155 may convert received audio data into an electrical signal and then transmit converted electrical signal to the loudspeaker 116, and the loudspeaker 116 converts the electrical signal into a sound signal for output. In addition, the microphone 117 converts a collected sound signal into an electrical signal, and the audio circuit 155 receives the electrical signal, converts the electrical signal into audio data, and then sends the audio data to another terminal device by using the modem 107 and the radio frequency module 109, or outputs the audio data to the memory 105 for further processing.

In addition, the terminal device 100 may further have a fingerprint recognition function. Specifically, a fingerprint collection device may be configured on the back of the terminal device 100 (for example, a lower part of a rear-facing camera), or a fingerprint collection device may be configured on the front of the terminal device 100 (for example, a lower part of the touchscreen 153). For another example, a fingerprint collection device may be configured in the touchscreen 153 to implement the fingerprint recognition function. In other words, the fingerprint collection device may be integrated with the touchscreen 153 to implement the fingerprint recognition function of the terminal device 100. In this case, the fingerprint collection device is configured on the touchscreen 153, and may be a part of the touchscreen 153, or may be configured on the touchscreen 153 in another manner. A main component of the fingerprint collection device in this embodiment of this application is a fingerprint sensor. The fingerprint sensor may use any type of sensing technology that includes but is not limited to an optical sensing technology, a capacitive sensing technology, a piezoelectric sensing technology, an ultrasonic sensing technology, or the like.

Further, the operating system 161 used in the terminal device 100 may be iOS®, Android®, Microsoft®, or another operating system. This is not limited in this embodiment of this application.

A terminal device 100 equipped with the Android® operating system is used as an example. The terminal device 100 may be logically divided into a hardware layer, an operating system 161, and an application layer. The hardware layer includes hardware resources such as the application processor 101, the microcontroller unit 103, the modem 107, the Wi-Fi module 111, the sensor 114, and the positioning module 150 that are described above. The application layer includes one or more application programs, for example, the application program 163. The application program 163 may be any type of application program, for example, a social application, an e-commerce application, or a browser. The operating system 161 is used as software middleware between the hardware layer and the application layer, and is a computer program for managing and controlling hardware and a software resource.

In an embodiment, the operating system 161 includes a kernel, a hardware abstraction layer (HAL), a library and runtime, and a framework. The kernel is configured to provide an underlying system component and service, for example, power management, memory management, thread management, and a hardware driver. The hardware driver includes a Wi-Fi driver, a sensor driver, a positioning module driver, and the like. The hardware abstraction layer encapsulates a kernel driver, provides an interface for the framework, and shields implementation details of a lower layer. The hardware abstraction layer is run in user space, and the kernel driver is run in kernel space.

The library and runtime is also referred to as a runtime library, and provides a library file and an execution environment that are required by an executable program at runtime. In an embodiment, the library and runtime includes Android runtime (ART), a library, and a scenario package runtime. The ART is a virtual machine or a virtual machine instance that can convert bytecode of an application program into machine code. The library is a program library that provides support for the executable program at runtime, and includes a browser engine (for example, a webkit), a script execution engine (for example, a JavaScript engine), a graphics processing engine, and the like. The scenario package runtime is a running environment of a scenario package, and mainly includes a page execution environment (page context) and a script execution environment (script context). The page execution environment invokes a corresponding library to parse page code in an html, css, or another format, and the script execution environment invokes a corresponding function library to parse and execute code or an executable file implemented by a script language such as JavaScript.

The framework is configured to provide various basic common components and services, such as window management and location management, for an application program at the application layer. In an embodiment, the framework includes a Geofence service, a policy service, a notification manager, and the like.

All functions of components in the operating system 161 described above may be implemented by the application processor 101 by executing programs stored in the memory 105.

A person skilled in the art may understand that the terminal device 100 may include fewer or more components than those shown in FIG. 2. The terminal device shown in FIG. 2 merely includes components more related to a plurality of implementations disclosed in the embodiments of this application.

Figure 3:
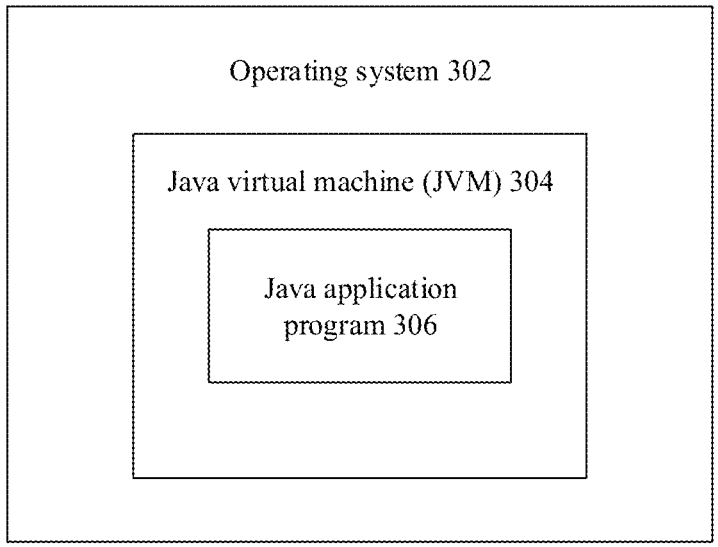
FIG. 3 is a schematic diagram of a running environment of a Java-based operating system according to an embodiment of this application.

Referring to FIG. 3, this block diagram shows a relationship between software components running in a computer system that can implement this application. A Java-based system includes a platform-specific operating system 302. The operating system provides hardware and system support for software executing on a specific hardware platform. A JVM 304 is a software application that can be executed with the operating system. The JVM 304 provides a Java runtime environment, and the environment has a capability of executing a Java application program 306. The Java application program or an applet is a program, a mini-service program, or a software component that is written in a Java programming language. A computer system in which the JVM 304 runs may be similar to the data processing system or the virtual computer component described above. However, the JVM 304 may be implemented in a so-called Java chip with an embedded picoJava kernel, Java-on-silicon, or a dedicated hardware on a Java processor.

The JVM is at the heart of the Java runtime environment, and supports all aspects of a Java environment, including an architecture, a security feature, cross-network mobility, and platform independence of the Java environment.

The JVM is a virtual computer, namely, a computer that is abstractly specified. A specification defines some features that each JVM needs to implement and implementation of the JVM that meets requirements of the specification on a platform on which the JVM is to execute is flexible. For example, all JVMs need to execute Java bytecode and can use a range of techniques to execute instructions represented by the bytecode. The JVM can be implemented entirely in software or, to some extent, in hardware. This flexibility allows different JVMs to be designed for mainframe computers and PDAs.

The JVM is a name of a virtual computer component that actually executes a Java program. The Java program is not run directly by a central processing unit, but by the JVM. The JVM is a piece of software running on the processor. The JVM allows the Java program to be executed on different platforms rather than only on one platform that compiles code for the Java program. The Java program is compiled for the JVM. In this way, Java can support applications for a plurality of types of data processing systems. These data processing systems can include various central processing units and operating system architectures. To make Java applications to be executed on the different types of data processing systems, a compiler usually generates an architecture-neutral file format. If there is a Java runtime system, compiled code can be executed on a plurality of processors. The Java compiler generates bytecode instructions that are not specific to a specific computer architecture. Bytecode is machine-independent code generated by the Java compiler and interpreted by a Java interpreter. The Java interpreter is a module that is in the JVM and that alternately decodes and executes one or more bytecode. These bytecode instructions are designed to be easy to execute on any machine and to be converted on the fly into host machine code. The bytecode can be converted to host code by a just-in-time (JIT) compiler.

The JVM loads a class file and executes bytecode in the class file. The class file is loaded by a class loader in the JVM. The class loader loads the class file from an application and loads the class file from a Java application programming interface (API) required by the application. An execution engine that executes the bytecode may vary depending on different platforms and implementations.

Figure 4:
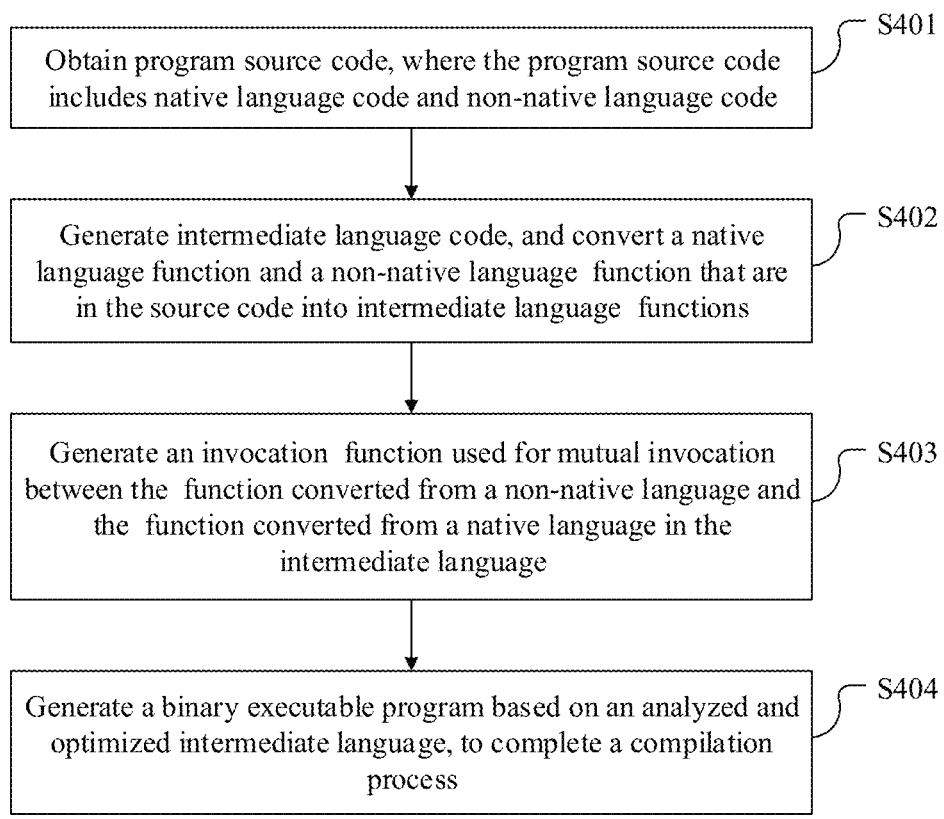
FIG. 4 is a flowchart of a method in a compilation process according to an embodiment of this application.

FIG. 4 is a flowchart of a method according to an embodiment of this application. The method is applied to a compilation process of program source code, and includes the following steps.

S401: Obtain program source code, where the program source code includes native language code and non-native language code.

The obtained program source code is program source code of mixed language programming, and includes the native language code and the non-native language code. The native language code includes a native language function, and the non-native language code includes a non-native language function. There is mutual invocation between the native language function and the non-native language function.

S402: Generate intermediate language code, and convert the native language function and the non-native language function that are in the source code into intermediate language functions.

In the compilation process, the native language code and the non-native language code that are in the program source code need to be converted into unified intermediate language representations. The intermediate language representation is a type of intermediate code. To convert the native language code and the non-native language code into the unified intermediate language representations, the functions in the source code first need to be converted into the intermediate language functions. When the intermediate language representations are converted into, for the intermediate language functions converted from the native language function and the non-native language function, function bodies of the intermediate language functions are the same. A difference lies in function definition scopes. For example, the intermediate language function corresponding to the native language function defines a global function while the intermediate language function corresponding to the non-native language function defines a class function in a class. Therefore, in the intermediate language functions, class information of the non-native language is reserved for the function corresponding to the non-native language.

Java and C/C++ are used as examples. The native language C/C++ and the non-native language Java each implement a function (also refer to as "Method" or "method") foo in code. In a compilation process, a Java language program and a C/C++ language program are first converted into unified intermediate language representations. If the C/C++ language defines a global foo function, and the Java language defines a class function foo in a class internTest, after the intermediate language representations are converted into, a main difference between an intermediate function corresponding to the class function foo of the Java language and an intermediate language function corresponding to the global function foo defined by the C/C++ language is that class information is reserved for definition of the class function and a first parameter of the function is this pointer. If the class function foo in the class internTest is defined in the C++ language and the class function foo in the class internTest is defined in the Java language, function bodies of the intermediate language functions converted from the C++ language and the Java language are the same, and class information is also the same.

In some implementations, an intermediate language function carries a function attribute flag, and the flag is used to indicate whether the intermediate language function is converted from the native language or converted from the non-native language. This flag can be used to perform stack unwinding quickly when an exception occurs during running.

In some implementations, an inheritance relationship (CHA) of a class may also be constructed in the intermediate language, for example, a virtual function table is generated in the intermediate language in the compilation process based on the inheritance relationship. For example, in FIG. 5, four classes are defined as follows:

class A {fooA( )};
class B extend A {fooB( );};
class C extend B {fooA( );}; and
class D extend B {fooD( );}.

Figure 5:
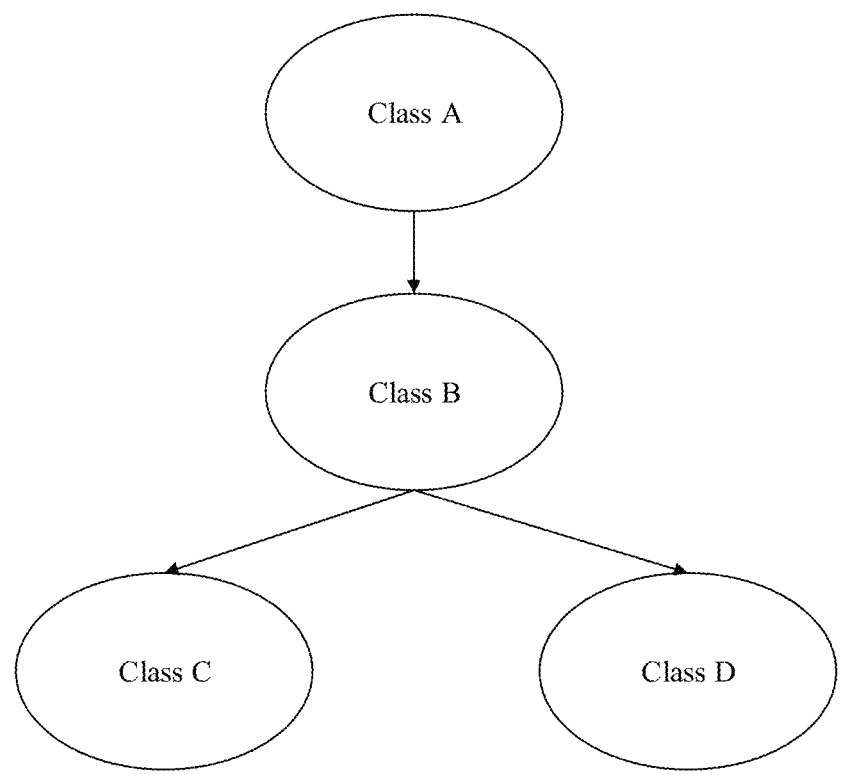
FIG. 5 is a schematic diagram of an inheritance relationship of a class according to an embodiment of this application.
Figure 6:
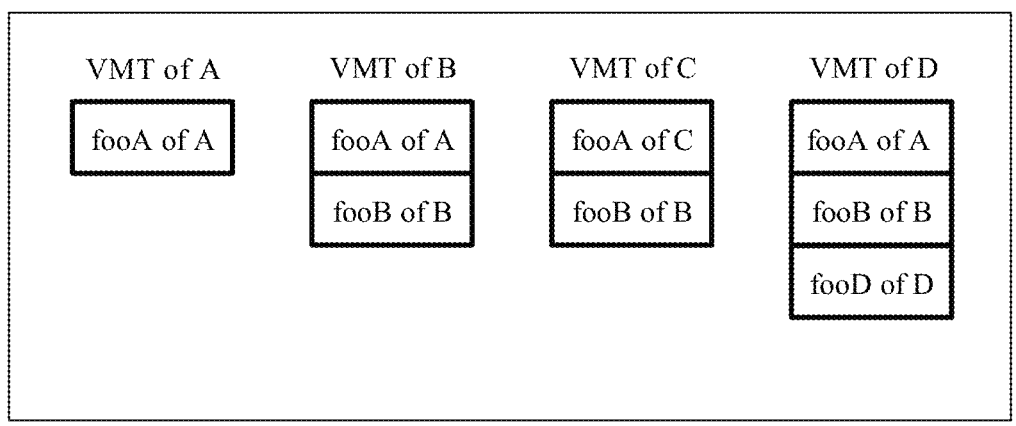
FIG. 6 is a schematic diagram of a virtual function table of a class according to an embodiment of this application.

FIG. 5 shows an inheritance relationship of the four classes. The class B inherits the class A, the class C inherits the class B, and the class D also inherits the class B. FIG. 6 shows a virtual function table (VFT) of the four classes. At a virtual function invocation point, an index of a function in the virtual function table is also determined at a compilation time point. During execution of the intermediate language at runtime, a process of virtual function invocation is as follows: Determine an instance of a class to which an object belongs, for example, determine an instance of a class to which a pointer belongs; use a function index to search a virtual function table of a corresponding class, to determine a function that is actually invoked; and return a function pointer that is actually invoked.

In some implementations, an interface function table of a class may be further added in the intermediate language. The interface function table includes a hash table and a conflict elimination table. When a program executes an interface function of the class at runtime, and searches the hash table for the interface function by using a hash value of a function signature. If the function is found, an address of the function is returned. Otherwise, the function signature is used to search the conflict elimination table for the function and the address of the function is returned.

For example, all interfaces implemented by a class are collected when compiling the Java program. Due to a multi-inheritance relationship, interface functions cannot be sorted like functions in class inheritance, to generate a function table. For all the interface functions implemented by the class, a hash table is generated based on a function signature during compilation. The hash table stores a corresponding function pointer. When a conflict occurs, a conflict elimination table is constructed to save the function signature and the corresponding function pointer. For example, the following provides three interfaces implemented by the class A. It can be learned that the class A needs to implement three interface functions such as fooB, fooC, and fooD:

interface B {fooB( );};
interface C {fooC( );}; and
interface D {fooD( );}.
class A implements B, C, D{ }.

Figure 7:
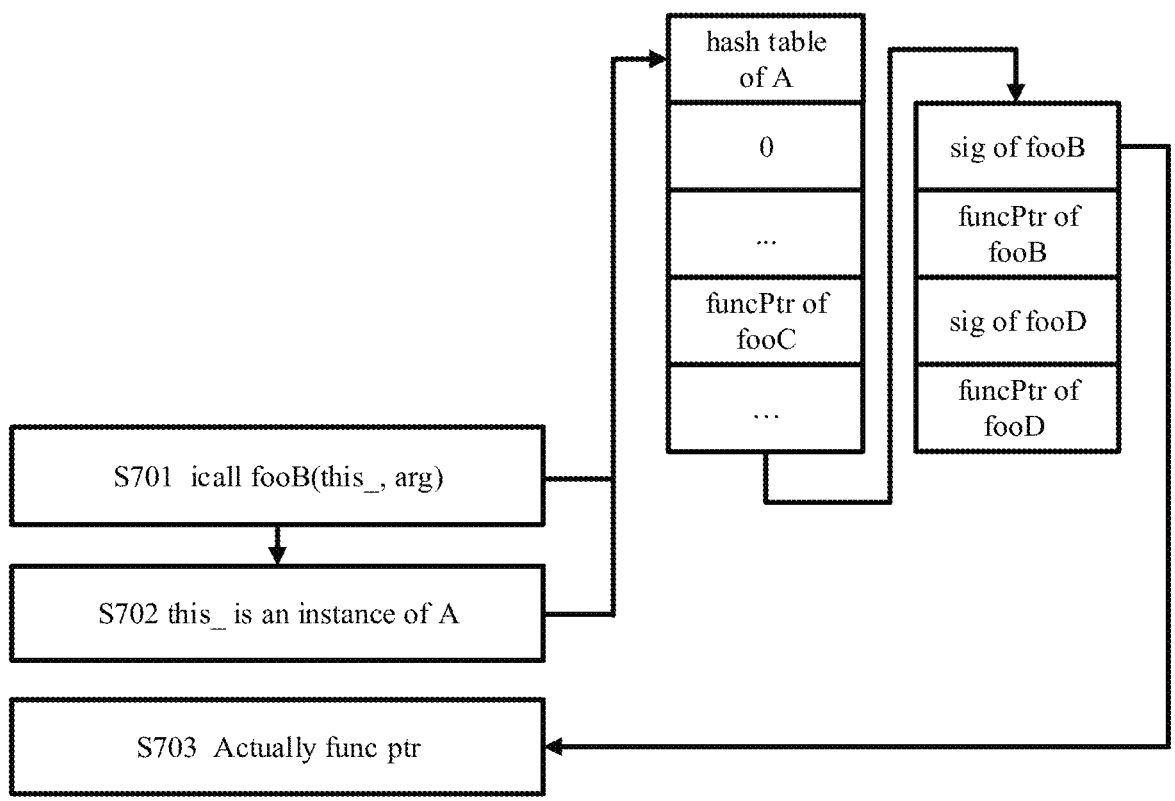
FIG. 7 is a schematic diagram of an interface function hash table and a conflict elimination table that are of a class according to an embodiment of this application.

FIG. 7 describes examples of an interface function hash table and a conflict elimination table of the class A. In the hash table, a function pointer corresponding to the fooC is filled in a corresponding position based on a hash value of a function signature of the fooC. If there is no corresponding function or more than one corresponding function in a position (a conflict occurs), 0 is filled in the position. When the conflict occurs, for example, a hash value of a signature of the fooB is the same as a hash value of a signature of the fooD, the signature and a corresponding function address corresponding to each function are stored in the conflict elimination table. Because calculation of the interface function table and the hash value of the function signature is completed at the compilation time point, a variable-length hash table may be used and a plurality of types of hash functions may be used to reduce conflicts and reduce a size of the hash table, so as to reduce memory consumption and improve virtual vocation performance.

With reference to FIG. 7, the following method procedure describes how the interface function table is used in an execution process of intermediate language code.

S701: Determine an instance of a class to which an object belongs.

S702: Search a hash table of a corresponding class based on a hash value of a function signature for the function; and if the function is found, return a function pointer, or otherwise, search the conflict elimination table by using the function signature for the function.

S703: Return a function pointer that is actually invoked.

In some implementations, data required for non-native language reflection is generated in intermediate language code. The data includes metadata information of a class, field information of a class, and Method information of a class. For example, when a non-native language is Java, JNI interface functions such as GetMethodID and CallVoidMethod are converted into Intrinsic by using the metadata information of the class, the field information of the class, and the Method information of the class. In addition, semantics of the Intrinsic can be known by a compiler.

For example, in FIG. 8, a box A provides a code example in which the C/C++ invokes a Java function. A box B, a box C, and a box D respectively provide data structures of metadata information of a class, Method information of a class, and field information of a class that are generated in an intermediate language code in a compilation process. During execution of the intermediate language code:

(1) A function FindClass searches for ClassMetadata information of all classes and searches for ClassMetadata of a corresponding class by comparing parameters and classnames;
(2) A function GetMethodID finds all Method information about the class based on methods in the ClassMetadata, and then finds a corresponding Method based on the second parameter and the third parameter (a function name, a function parameter, and return value information);
(3) A function NewObjectA invokes a Java Method corresponding to con. A pointer of the Method is stored in addr in MethodMetadata, to create a Java object.
(4) A class Method corresponding to mid in the class is invoked;
(5) A function GetFieldID finds information about all fields of the class based on fields in the ClassMetadata, and then finds a corresponding field based on the second parameter and the third parameter (a field name and field type information); and
(6) A function SetObjectField is used to assign a value to a field fid of an object jobj. If the field is a non-static field, realOffset in the field information provides offset of the field in the object jobj. If the field is a static field, absAddress in the field information provides an address of the static field.

S403: Generate an invocation function used for mutual invocation between the function converted from the non-native language and the function converted from the native language in the intermediate language.

The native language function and the non-native language function are both converted into the intermediate language functions. Therefore, for the native language function and the non-native language function that have a mutual invocation relationship, mutual visibility is implemented by using the converted intermediate language functions in the compilation process. Therefore, the native language function and the non-native language function that originally have the mutual invocation relationship may be analyzed and optimized based on the converted intermediate language functions, to generate an optimized function for the mutual invocation between the native language function and the non-native language function.

In some implementations, the invocation function in the intermediate language is used to complete, at runtime, the invocation between the function converted from the non-native language and the function converted from the native language with reference to the function converted from the non-native language and the function converted from the native language.

In other implementations, when the invocation function in the intermediate language is generated, the function converted from the non-native language and the function converted from the native language may be integrated into the invocation function in an inline manner, so that at runtime, the invocation function can independently implement the mutual invocation between the function converted from the non-native language and the function converted from the native language.

The following uses an example to describe how to generate, in the intermediate language, the invocation function for the mutual invocation between the function converted from the non-native language and the function converted from the native language.

Figure 9:
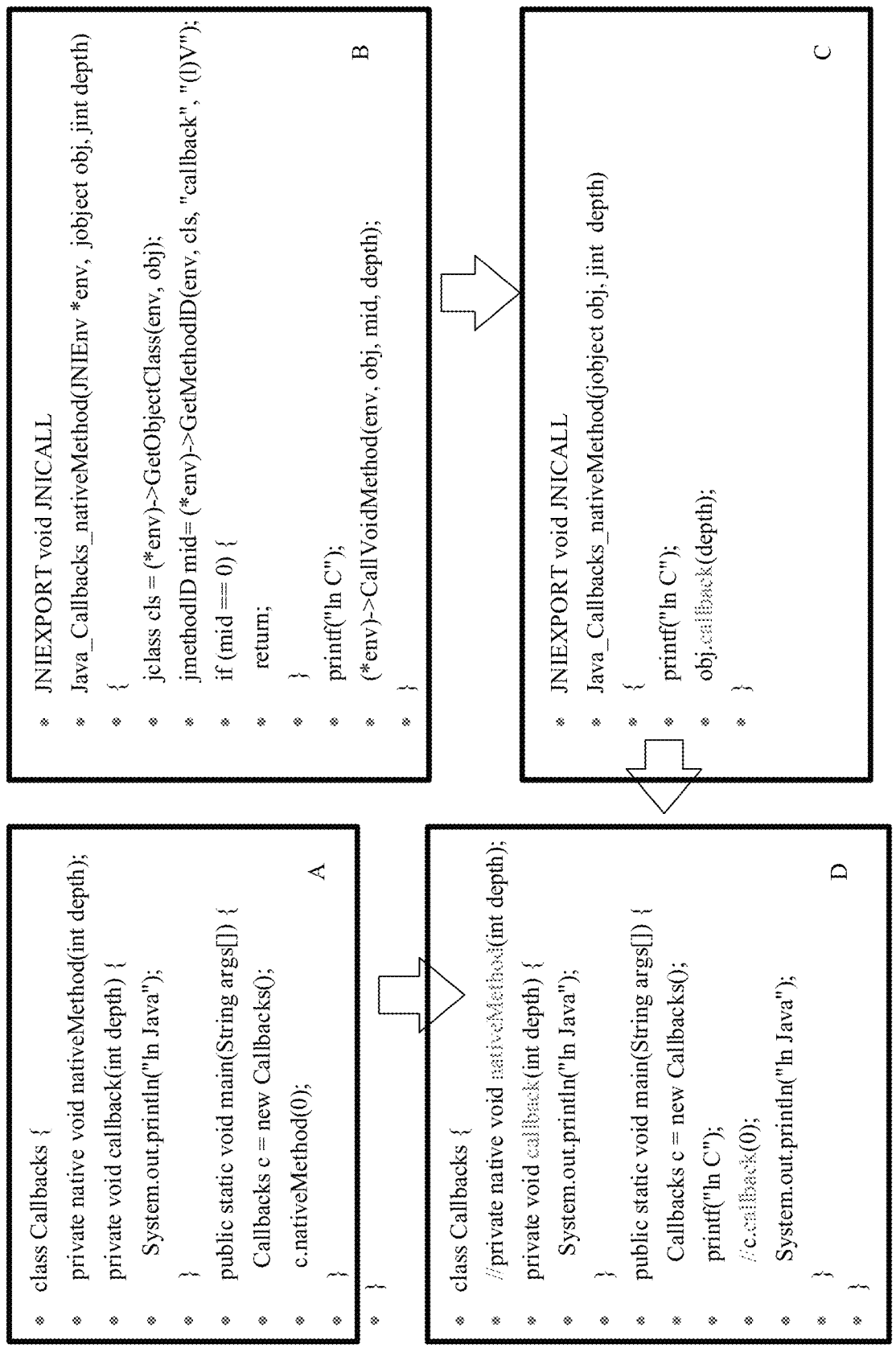
FIG. 9 is another code example diagram according to an embodiment of this application.

As shown in FIG. 9, a class Callbacks of the Java declares that a C/C++ function nativeMethod is invoked. Box B describes a definition of the C/C++ function nativeMethod. The nativeMethod invokes JNI interface functions GetObjectClass, GetMethodID, and CallVoidMethod, to invoke a class Method callback of the class Callbacks. For a standard JNI, a function to be invoked can only be found at runtime by using a parameter obj. In this example, Methods in Box A and Methods in Box B both are converted into intermediate language representations. That is, for the compiler, an inheritance relationship of the class Callbacks and the definition of the function nativeMethod can be obtained at the same time. Therefore, the inheritance relationship of the class Callbacks at a Java end can be transferred to a C/C++ end by using the compiler. In addition, after knowing semantics of the JNI interface functions, the compiler can obtain through analysis that the CallVoidMethod finally invokes the class Method callback of the class Callbacks. Thus, functions shown as in Box C can be generated in the intermediate code. Compared with the function nativeMethod in Box B, the functions in Box C delete a parameter (a JNI interface pointer) and original JNI interface function invocation. The functions in Box C can be used for mutual invocation between the native language Method nativeMethod and the non-native language Method callback.

In some implementations, program analysis and optimization may also be performed on the Java and C/C++ functions in Box A and Box C. First, the nativeMethod is inlined into a function main, and then the function callback is also inlined into the function main. Finally, the functions shown in a box D are obtained.

S404: Generate a binary executable program based on the analyzed and optimized intermediate language, to complete the compilation process.

According to the embodiments of this application, when the mixed source code including the native language and the non-native language is compiled, the native language and the non-native language are converted into the intermediate language, and the invocation function is generated based on the invocation relationship between the native language function and the non-native language function, to implement the mutual invocation between the functions in the intermediate language. Because the compiler can learn of the function information of the native language and the function information of the non-native language at the same time by using the intermediate language, when the invocation function between the native language and the non-native language is generated, the invocation function may be optimized based on the function information of the native language and the function information of the non-native language. Compared with the conventional technology, the embodiments of this application reduces the overheads of the mutual invocation between the native language function and the non-native language function at runtime.

On the basis of this embodiment, the following describes, by using several embodiments, that in a process of generating an intermediate language, analysis and optimization are performed on intermediate language functions, so as to generate an invocation function for mutual invocation between a native language function and a non-native language function.

Figure 10:
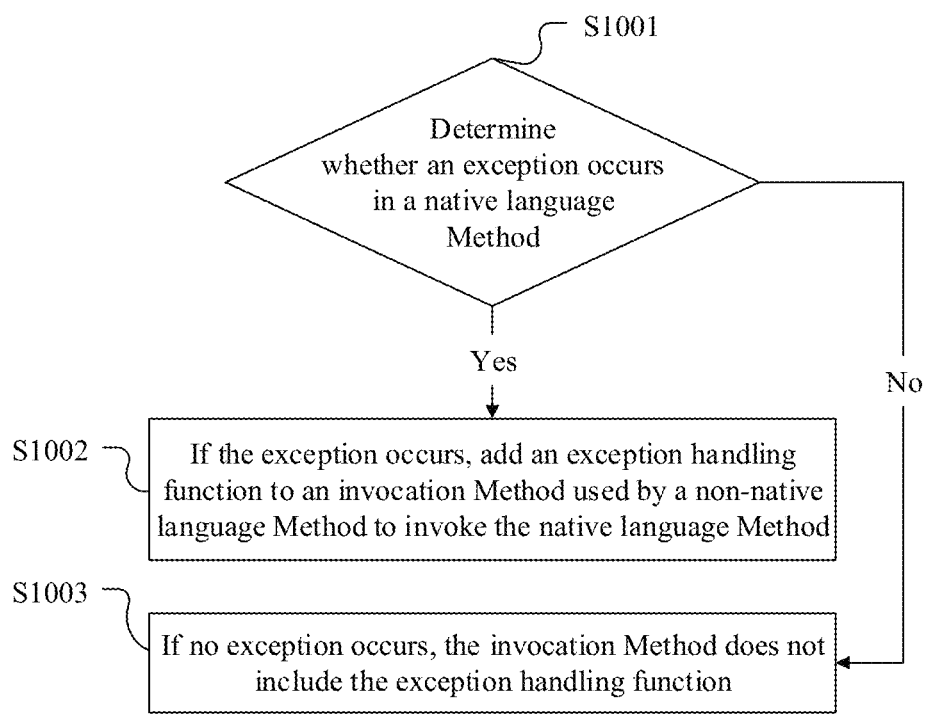
FIG. 10 is a flowchart of an intermediate language optimization procedure according to an embodiment of this application.

FIG. 10 is an intermediate language optimization procedure according to an embodiment of this application. This embodiment is based on the embodiment shown in FIG. 4. After the intermediate code is converted into, functionfunctionfunctionthe invocation function is generated in the intermediate code for the mutual invocation between the function converted from the non-native language and the function converted from the native language.

S1001: Determine whether an exception occurs in the native language function.

The compiler can determine whether the exception occurs when the native language function is invoked by the non-native language based on the converted native language function invoked by the non-native language function in the intermediate language.

S1002: If the exception occurs, add an exception handling function to the invocation function used by the non-native language function to invoke the native language function. For example, in some examples, checkPendingException can be added to an invocation function used by the Java to invoke the C/C++, to implement the exception handling function.

S1003: If no exception occurs, the invocation function does not include the exception handling function.

According to this embodiment, when the invocation function used for the non-native language to invoke the native language is generated, it is first determined whether an exception occurs when the native language function is invoked by the non-native language, and then it is determined, based on a determining result, whether the exception handling function is added to the invocation function. In the conventional technology, when the Java invokes the native language function, exception handling needs to be invoked at runtime, to check whether there is an unprocessed exception object. In this embodiment, the invocation method is generated in the compilation process, and the exception handling function is included only when the exception occurs in the native language. This reduces exception handling overheads at runtime.

Figure 11:
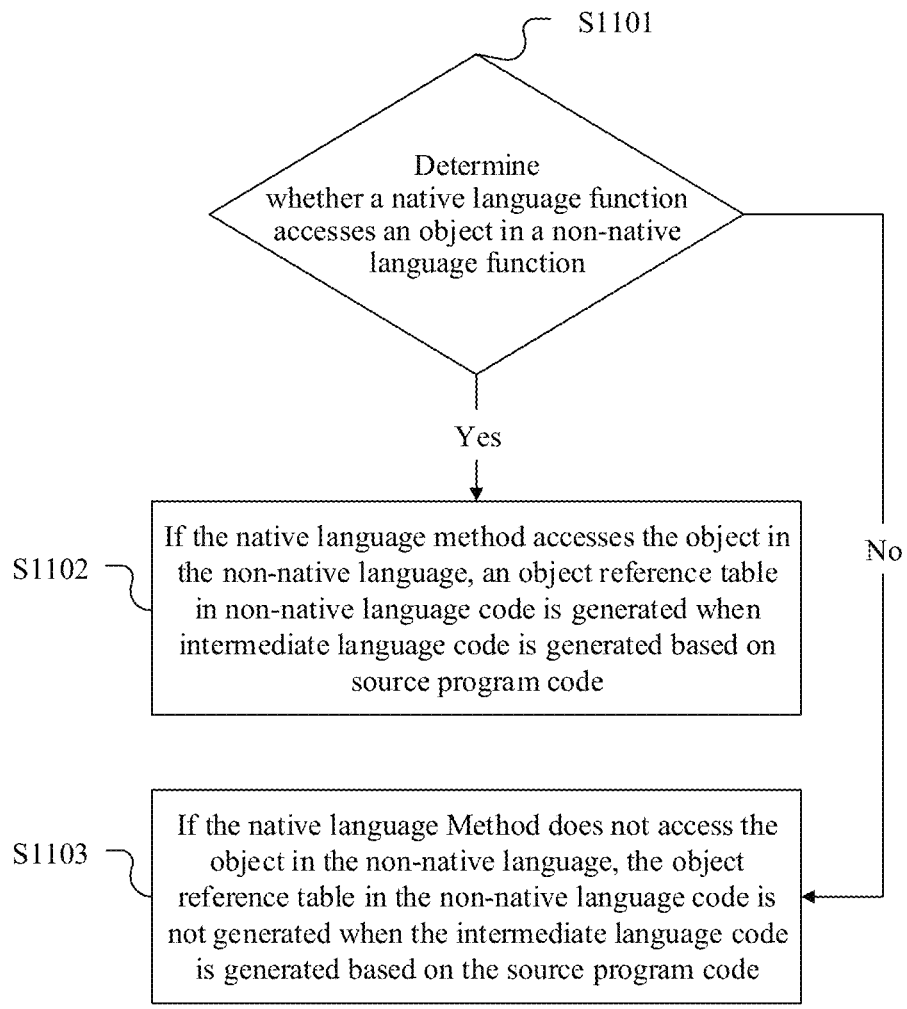
FIG. 11 is a flowchart of another intermediate language optimization procedure according to an embodiment of this application.

FIG. 11 is a flowchart of another intermediate language optimization procedure according to an embodiment of this invention. This embodiment is based on the embodiment shown in FIG. 4. After the intermediate code is converted into, the invocation function is generated in the intermediate code for the mutual invocation between the function converted from the non-native language and the function converted from the native language.

S1101: Determine whether the native language function accesses an object in the non-native language.

The compiler can determine whether the native language function accesses the object in the non-native language based on the converted native language function invoked by the non-native language in the intermediate language.

S1102: If the native language function accesses the object in the non-native language, an object reference table in the non-native language code is generated when the intermediate language code is generated based on the source program code.

S1103: If the native language function does not access the object in the non-native language, the object reference table in the non-native language code is not generated when the intermediate language code is generated based on the source program code.

To prevent a Java object from being reclaimed when the C/C++ function operates the Java object, Java objects involved in all parameters needed to be traced. Usually, these Java objects are combined into an object reference table. In this embodiment of this application, when the intermediate code is generated, a reference status of the Java object in the C/C++ program may be analyzed, the Java object reference table may be created as required, and a reference that is no longer used may be released in a timely manner. In this way, overheads of creating the object reference table can be reduced.

Figure 12:
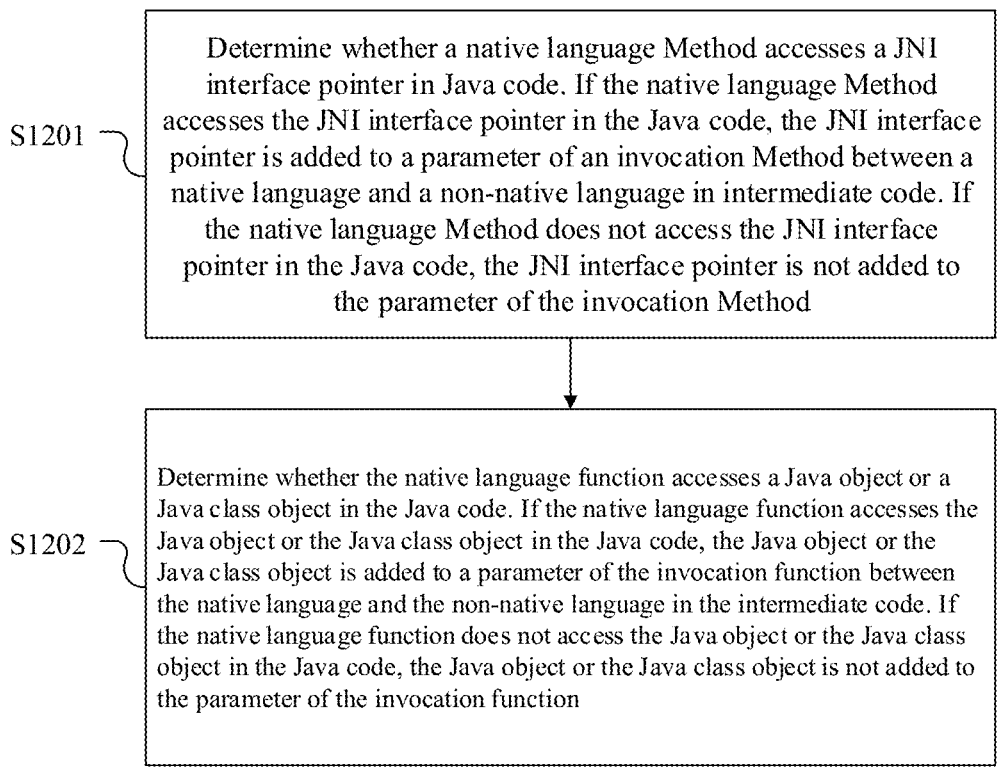
FIG. 12 is a flowchart of another intermediate language optimization procedure according to an embodiment of this application.

FIG. 12 is still another intermediate language optimization procedure according to an embodiment of this invention. This embodiment is based on the embodiment shown in FIG. 4. When the non-native language is Java, after the non-native language is converted into the intermediate code, the invocation function is generated in the intermediate code for the mutual invocation between the function converted from the non-native language and the function converted from the native language.

S1201: Determine whether the native language function accesses a JNI interface pointer in the Java code. If the native language function accesses the JNI interface pointer in the Java code, the JNI interface pointer is added to a parameter of the invocation function between the native language and the non-native language in the intermediate code. If the native language function does not access the JNI interface pointer in the Java code, the JNI interface pointer is not added to the parameter of the invocation function.

S1202: Determine whether the native language function accesses a Java object or a Java class object in the Java code. If the native language function accesses the Java object or the Java class object in the Java code, the Java object or the Java class object is added to a parameter of the invocation function between the native language and the non-native language in the intermediate code. If the native language function does not access the Java object or the Java class object in the Java code, the Java object or the Java class object is not added to the parameter of the invocation function.

In some implementations, the native language may be inlined to the invocation function in the intermediate language or the function corresponding to the non-native language.

In this embodiment, when the intermediate code is generated again, it is determined, based on whether the native language function accesses the JNI interface pointer in the Java code or accesses the Java object or the Java class object in the Java code, whether to add the JNI interface pointer, the Java object, or the Java class object to the invocation function. Compared with the conventional technology, invocation overheads caused by the JNI interface pointer, the Java object, or the Java class object can be reduced in this application.

The foregoing describes in detail the method in the embodiments of this application. The following provides an apparatus in the embodiments of this application.

Figure 13:
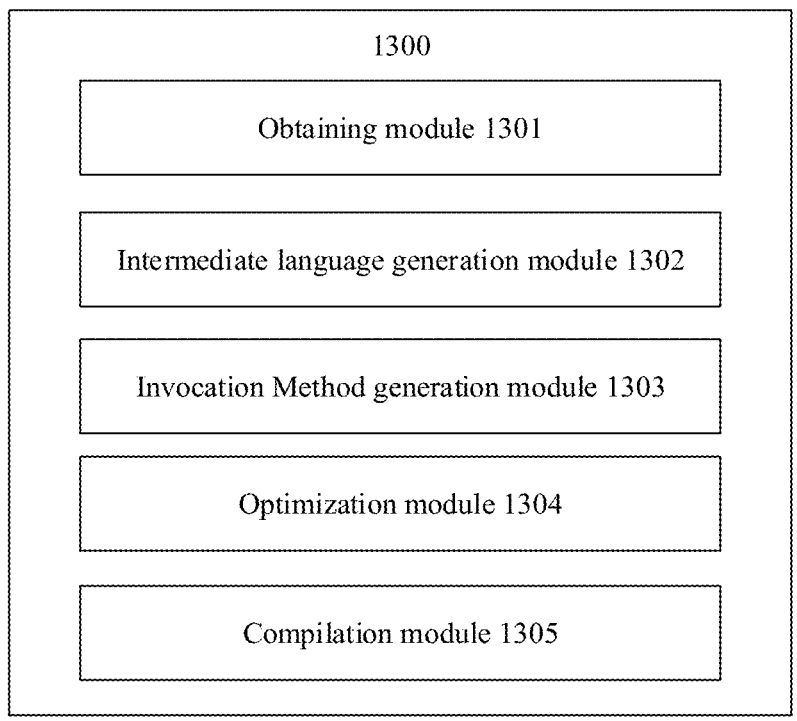
FIG. 13 is a logical structural diagram of a compilation system according to an embodiment of this application.

FIG. 13 is a logical structural diagram of a compilation system 1300 according to an embodiment of this application. The compilation system in this embodiment may be disposed on a compiler. The system may include a plurality of logical units, and each logical unit performs a corresponding function. The logical units are divided based on function and information exchange. It may be understood that the logical units may be implemented by using software, or may be implemented by using hardware, or may be separately implemented by using different hardware, or may be implemented by using common hardware. In addition, division of the logical units may also be adjusted based on different specific implementations, and a division manner in this embodiment is merely an example. In this embodiment, each unit is described in detail as follows.

An obtaining module 1301 is configured to obtain program source code, where the program source code includes native language code and non-native language code.

For specific function implementation of the obtaining module, refer to step S401 in the foregoing embodiment.

An intermediate language generation module 1302 is configured to generate intermediate language code, and convert a native language function and a non-native language function that are in the source code into intermediate language functions.

In some implementations, the intermediate language generation module 602 adds a function attribute flag to an intermediate language function. The flag is used to indicate whether the intermediate language function is converted from a native language or converted from a non-native language. This flag can be used to perform stack unwinding quickly when an exception occurs during running.

In some implementations, the intermediate language generation module 602 adds an interface function table of a class in the intermediate language. The interface function table includes a hash table and a conflict elimination table. When a program executes an interface function of the class at runtime, and searches the hash table for the interface function by using a hash value of a function signature. If the function is found, an address of the function is returned. Otherwise, the function signature is used to search the conflict elimination table for the function and the address of the function is returned.

In some implementations, the intermediate language generation module 602 generates data required for non-native language reflection in the intermediate language code, including metadata information of a class, field information of a class, and function information of a class. For example, when the non-native language is Java, JNI interface functions such as GetfunctionID and CallVoidfunction are converted into Intrinsic by using the metadata information of the class, the field information of the class, and the function information of the class. In addition, semantics of the Intrinsic can be known by the compiler.

For the intermediate language generation module 1302, refer to the description in step S402 in the foregoing embodiment.

An invocation function generation module 1303 is configured to generate an invocation function used for mutual invocation between the function converted by the non-native language and the function converted by the native language in the intermediate language.

In some implementations, the invocation function in the intermediate language is used to complete, at runtime, the invocation between the function converted from the non-native language and the function converted from the native language with reference to the function converted from the non-native language and the function converted from the native language.

In other implementations, when the invocation function in the intermediate language is generated, the function converted from the non-native language and the function converted from the native language may be integrated into the invocation function in an inline manner, so that at runtime, the invocation function can independently implement the mutual invocation between the function converted from the non-native language and the function converted from the native language.

For the invocation function generation module 1303, refer to the description in step S403 in the foregoing embodiment.

An optimization module 1304 is configured to optimize the generated intermediate language.

In some implementations, the optimization module 1304 is configured to determine whether an exception occurs in the native language function. If the exception occurs, the optimization module 1304 adds an exception handling function to the invocation function used to invoke the native language function in the non-native language.

In some implementations, the optimization module 1304 is configured to determine whether the native language function accesses an object in the non-native language. If the native language function accesses the object in the non-native language, an object reference table in non-native language code is generated when intermediate language code is generated based on the source program code.

In some implementations, the optimization module 1304 is configured to determine whether the native language function accesses a JNI interface pointer in Java code. If the native language function accesses the JNI interface pointer in the Java code, the JNI interface pointer is added to a parameter of the invocation function between the native language function and the non-native language function in the intermediate code. If the native language function does not access the JNI interface pointer in the Java code, the JNI interface pointer is not added to the parameter of the invocation function.

In some implementations, the optimization module 1304 is configured to determine whether the native language function accesses a Java object or a Java class object in the Java code. If the native language function accesses the Java object or the Java class object in the Java code, the Java object or the Java class object is added to a parameter of the invocation function between the native language function and the non-native language function in the intermediate code.

For the optimization module 1304, refer to the descriptions in the method embodiments corresponding to FIG. 10, FIG. 11, and FIG. 12.

A compilation module 1305 is configured to generate a binary executable program based on the analyzed and optimized intermediate language, to complete a compilation process.

According to this embodiment of this application, when the mixed source code including the native language and the non-native language is compiled, the native language and the non-native language are converted into the intermediate language, and the invocation function is generated based on an invocation relationship between the native language and the non-native language, to implement the mutual invocation between the functions in the intermediate language. Because the compiler can learn of function information of the native language and function information of the non-native language at the same time by using the intermediate language, when the invocation function between the native language and the non-native language is generated, the invocation function may be optimized based on the function information of the native language and the function information of the non-native language. Compared with the conventional technology, the embodiments of this application reduces overheads of the mutual invocation between the native language function and the non-native language function at runtime.

With development of technologies, design personnel almost all obtain a corresponding hardware circuit structure by programming an improved method process to a hardware circuit. Therefore, a method process may also be implemented by using a hardware entity module. For example, a Programmable Logic Device (PLD), for example, a Field Programmable Gate Array (FPGA) is such an integrated circuit, and a logic function of the programmable logic device is determined by a user by programming a device. The design personnel program to "integrate" a digital system into one PLD without a need for a chip manufacturer to design and manufacture an application-specific integrated circuit chip. In addition, today, instead of manually making an integrated circuit chip, such programming is also mostly implemented by using "logic compiler" software. The "logic compiler" software is similar to a software compiler used during program development and writing, and original code to be compiled is also written in a specific programming language that is referred to as a Hardware Description Language (HDL). The HDL does not have merely one type, but has a plurality of types, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and an Ruby Hardware Description Language (RHDL). Currently, a Very-High-Speed Integrated Circuit Hardware Description Language (VHDL) and Verilog are most commonly used currently. A person skilled in the art should also be aware that, a hardware circuit that implements a logic method process can be easily obtained provided that logic programming is slightly performed on the method process by using the foregoing several hardware description languages and the method process is programmed into an integrated circuit.

The modules or units described in the foregoing embodiment may be specifically implemented by a computer chip or an entity, or may be implemented by a product having a function. For example, this may be implemented by using the terminal device 100 corresponding to FIG. 2. In FIG. 2, one processor 101 is connected to the memory 105 through the bus. As a computer-readable storage medium, the memory 105 may be configured to store a software program, a computer-executable program, and a module, for example, program instructions/a module corresponding to the method in the embodiment shown in FIG. 4 to FIG. 12 in this application. The processor 101 runs the software program, the instructions, and the module that are stored in the memory 105, to perform various functional applications of the computer device and data processing, that is, to implement the foregoing method.

In some other implementations, a typical implementation device is a computer. Specifically, the computer may be, for example, a personal computer, a server, or a laptop computer. However, development of technologies result in continuous enhancement of a computing capability and a communication capability of a hardware device. Therefore, it can be predicted that in future technical implementation, various hardware devices with the computing capability and the communication capability are used as the hardware devices of the compilation system described above. For example, a cellular phone, a smartphone, a personal digital assistant, a media player, a vehicle-mounted computer, an Internet of Things device, a navigation device, a game device, and a tablet computer.

For ease of description, the foregoing apparatus is described by dividing the functions into various units. Certainly, when this application is implemented, functions of each unit may be implemented in one or more pieces of software and/or hardware.

The person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person of ordinary skill in the art may understand that all or some of the processes of the methods in the embodiments may be implemented by a computer program instructing related hardware. The program may be stored in a computer-readable storage medium. When the program runs, the processes of the methods in the embodiments are performed. The foregoing storage medium includes: any medium that can store program code, such as a ROM or a random access memory RAM, a magnetic disk or an optical disc.

What is claimed is:

1. A compilation method, wherein the method comprises:
   obtaining a source program code, wherein the source program code comprises a first function in a first language code and a second function in a second language code, the first language code is a native language, and the second language code is a non-native language; and
   generating a third language code based on the source program code, wherein the third language code comprises a third function, a fourth function and a fifth function, the third function is generated based on the first function, the fourth function is generated based on the second function, and the fifth function is generated based on the first function and the second function,
   wherein executing the third function invokes the fourth function via the fifth function, and
   wherein the third language code further comprises a field information of a class, a function information of the class, and an inheritance relationship of the class that are in the second language code.

2. The method according to claim 1, wherein generating the third language code based on the source program code comprises:
   determining that an exception occurs in the first function; and
   based on the determination that the exception occurs in the first function, generating the fifth function comprising an exception handling function.

3. The method according to claim 1, wherein generating the third language code based on the source program code further comprises:
   determining that the first function accesses an object in the second language code; and
   based on a determination that the third language code is generated based on the source program code, generating an object reference table of the object in the second language code.

4. The method according to claim 1, wherein the second language code is a Java language code and generating the third language code based on the source program code further comprises:

based on a determination that the first function accesses a Java native interface (JNI) pointer in the second language code, adding the JNI pointer to a parameter of the fifth function.

5. The method according to claim 1, wherein the second language code is a Java language code and generating the third language code based on the source program code further comprises:
based on a determination that the first function accesses one or more of a Java object or a Java class object in the second language code, adding one or more of the Java object or the Java class object to a parameter of the fifth function.

6. The method according to claim 1, wherein when the third language code is generated based on the source program code, generating the fifth function comprises:
determining a signature of the second function in the second language code based on the inheritance relationship of the class and the function information of the class, wherein the signature is used to indicate a name of the second function in the second language code and the class in which the second function is located in the second language; and
generating the fifth function based on the signature.

7. The method according to claim 1, wherein generating the third language code based on the source program code further comprises:
generating a sixth function based on the inheritance relationship of the class and the field information of the class, wherein the sixth function is used to access a field in the second language code.

8. An apparatus for compilation, comprising: a processor; and
a memory having instructions stored thereon that, when executed by the processor, causes the apparatus to:
obtain a source program code, wherein the source program code comprises a first function in a first language code and a second function in a second language code, the first language code is a native language, and the second language code is a non-native language; and
generate a third language code based on the source program code, wherein the third language code comprises a third function, a fourth function and a fifth function, the third function is generated based on the first function, the fourth function is generated based on the second function, and the fifth function is generated based on the first function and the second function,
wherein executing the third function invokes the fourth function via the fifth function, and
wherein the third language code further comprises a field information of a class, a function information of the class, and an inheritance relationship of the class that are in the second language code.

9. The apparatus according to claim 8, wherein the apparatus is further caused to:
based on a determination that an exception occurs in the first function, generate the fifth function comprising an exception handling function.

10. The apparatus according to claim 8, wherein the apparatus is further caused to:
based on a determination that the third language code is generated based on the source program code, generate an object reference table of the object in the second language code.

11. The apparatus according to claim 8, wherein the apparatus is further caused to:
based on a determination that the first function accesses a Java native interface (JNI) pointer in the second language code, add the JNI pointer to a parameter of the fifth function.

12. The apparatus according to claim 8, wherein the apparatus is further caused to:
based on a determination that the first function accesses at least one of a Java object or a Java class object in the second language code, add the Java object or the Java class object to a parameter of the fifth function.

13. The apparatus according to claim 8, wherein the apparatus is further caused to:
determine a signature of the second function in the second language code based on the inheritance relationship of the class and a function information of the class, wherein the signature is used to indicate a name of the second function in the second language code and the class in which the second function is located in the second language; and
generate the fifth function based on the signature.

14. The apparatus according to claim 8, wherein the apparatus is further caused to:
generate a sixth function based on an inheritance relationship of a class and a field information of the class, wherein the sixth function is used to access a field in the second language code.

15. A non-transitory computer-readable medium having instructions stored thereon that, when executed by a processor, cause a terminal to:
obtain a source program code, wherein the source program code comprises a first function in a first language code and a second function in a second language code, the first language code is a native language, and the second language code is a non-native language; and
generate a third language code based on the source program code, wherein the third language code comprises a third function, a fourth function and a fifth function, the third function is generated based on the first function, the fourth function is generated based on the second function, the fifth function is generated based on the first function and the second function,
wherein executing the third function invokes the fourth function via the fifth function, and
wherein the third language code further comprises a field information of a class, a function information of the class, and an inheritance relationship of the class that are in the second language code.

16. The non-transitory computer readable medium according to claim 15, wherein the terminal is caused to generate the third language code based on the source program code by:
determining that an exception occurs in the first function; and
generating the fifth function comprising an exception handling function.

17. The non-transitory computer readable medium according to claim 15, wherein the terminal is further caused to generate the third language code based on the source program code by:
determining that the first function accesses an object in the second language code; and
generating an object reference table of the object in the second language code based on a determination that the third language code is generated based on the source program code.

18. The non-transitory computer readable medium according to claim 15, wherein the second language code is Java language code and the terminal is further caused to generate the third language code based on the source program code by:
  adding the JNI pointer to a parameter of the fifth function based on a determination that the first function accesses a Java native interface (JNI) pointer in the second language code.

* * * * *